(12) United States Patent
Shelestak et al.

(10) Patent No.: US 7,560,404 B2
(45) Date of Patent: Jul. 14, 2009

(54) UV ABSORBING GRAY GLASS COMPOSITION

(75) Inventors: Larry J. Shelestak, Bairdford, PA (US);
Mehran Arbab, Pittsburgh, PA (US);
Dennis G. Smith, Butler, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 631 days.

(21) Appl. No.: 11/222,406

(22) Filed: Sep. 8, 2005

(65) Prior Publication Data

US 2007/0054796 A1    Mar. 8, 2007

(51) Int. Cl.
*C03C 3/087*    (2006.01)
*C03C 3/095*    (2006.01)

(52) U.S. Cl. ............................. 501/70; 501/64; 501/71
(58) Field of Classification Search ................... 501/70, 501/71, 64
See application file for complete search history.

(56) References Cited

U.S. PATENT DOCUMENTS

| | | | |
|---|---|---|---|
| 5,478,783 A * | 12/1995 | Higby et al. ................. 501/27 |
| 5,958,811 A * | 9/1999 | Sakaguchi et al. ............. 501/71 |
| 5,977,002 A | 11/1999 | Boulos et al. ................. 501/71 |
| 6,170,292 B1 | 1/2001 | Boulos et al. ................. 65/30.1 |
| 6,596,660 B1 | 7/2003 | Boulos et al. ................. 501/70 |
| 6,821,918 B2 * | 11/2004 | Boulos et al. ................. 501/70 |
| 6,998,362 B2 * | 2/2006 | Higby et al. .................. 501/71 |
| 7,179,763 B2 * | 2/2007 | Teyssedre et al. ............. 501/71 |
| 2002/0025899 A1 * | 2/2002 | Higby et al. .................. 501/71 |
| 2004/0102304 A1 * | 5/2004 | Boulos et al. ................. 501/70 |
| 2004/0171473 A1 * | 9/2004 | Teyssedre et al. ............. 501/70 |
| 2005/0020430 A1 | 1/2005 | Thomsen et al. .............. 501/64 |
| 2005/0170944 A1 * | 8/2005 | Arbab et al. .................. 501/64 |

FOREIGN PATENT DOCUMENTS

| | | |
|---|---|---|
| GB | 2395479 | 5/2004 |
| WO | WO 01/49622 | 7/2001 |
| WO | WO 2005/042425 | 5/2005 |

* cited by examiner

*Primary Examiner*—Karl E Group
*Assistant Examiner*—Elizabeth A Bolden
(74) *Attorney, Agent, or Firm*—Andrew C. Siminerio

(57) ABSTRACT

A novel glass composition is disclosed. The glass composition includes a base glass composition made up of $SiO_2$ from 65 to 75 weight percent, $Na_2O$ from 10 to 20 weight percent, CaO from 5 to 15 weight percent, MgO from 0 to 5 weight percent, $Al_2O_3$ from 0 to 5 weight percent, $K_2O$ from 0 to 5 weight percent, $B_2O_3$ 0 to 5%, and $MnO_2$ 0 to 0.5%, and a colorant and property modifying material portion made up of total iron up to 0.65 weight percent, Se ranging from 2 PPM to 10 PPM, at least one UV absorber selected from $CeO_2$, $V_2O_5$, $TiO_2$ and $MoO_3$, CoO up to 20 PPM, and $Cr_2O_3$ up to 75 PPM, wherein the glass composition has a redox ratio ranging from 0.2 to 0.6.

20 Claims, No Drawings

UV ABSORBING GRAY GLASS COMPOSITION

FIELD OF THE INVENTION

The present invention relates to glass compositions, particularly to gray glass compositions with good ultraviolet ("UV") absorbance properties.

BACKGROUND OF THE INVENTION

Glass substrates are used in a variety of applications such as automotive applications, architectural applications, aerospace applications, etc. Depending on the end use of the glass substrate, it will be desirable for the glass substrate to exhibit certain (a) aesthetic properties, such as, but not limited to, color and (b) solar control properties, such as, but not limited to, total solar energy transmittance ("TSET"), infrared transmittance and ultraviolet transmittance.

For example, glass substrates are used in automotive applications as automotive vision panels (i.e., front windows, sidelights, etc.). Automotive vision panels need to exhibit a desirable color. At present, desirable colors for automotive vision panels include blue, green and gray. Further, if the automotive vision panel is used as a front windshield in a vehicle driven in the United States, it will have to exhibit a visible light transmittance ("Lta") of equal to or greater than 70%. Countries other than the United States have different Lta requirements for front windshields.

One of the ways the aesthetic properties and solar control properties of a glass substrate can be modified involves changing the chemical composition (i.e., the type of materials that make up the glass composition and/or the weight percentages of the various materials in the glass composition) of the glass substrate. Oftentimes, colorants and/or other materials capable of modifying the solar properties of a glass composition are added to a well known base glass composition such as a soda-lime-silica base glass composition to provide a glass substrate capable of exhibiting unique performance properties. Although the effect of one colorant or one material capable of modifying the solar properties of a glass composition may be known (for example, it is known that adding FeO to a base glass composition increases the infrared (IR) absorption of the glass composition), it is the essence of invention to use various colorants and/or materials capable of modifying the solar properties of a glass composition, each colorant or material capable of producing a unique effect individually, to collectively achieve a combination of performance properties.

According to the present invention, novel materials are added in novel amounts to a soda-lime-silica base glass composition to provide glass substrates capable of exhibiting the desired aesthetic and solar control properties. The combination of desired aesthetic and solar control properties realized by the glass composition in a substrate at a thickness of 3.9 mm (0.1535 inches) of the present invention are as follows:

1. a neutral gray color characterized by a dominant wavelength in the range of 480 to 580 nanometers and an excitation purity of equal to or less than 8%;
2. a visible light transmittance (Lta) of 60% or greater;
3. a total solar infrared transmittance (TSIR) equal to or less than 40%;
4. a total solar energy transmittance (TSET) equal to or less than 60%; and
5. a total solar ultraviolet transmittance (ISOUV) of equal to or less than 30%.

SUMMARY OF THE INVENTION

In a non-limiting embodiment, the invention is a glass composition comprising a base glass composition comprising $SiO_2$ 65 to 75 weight percent, $Na_2O$ 10 to 20 weight percent, CaO 5 to 15 weight percent, MgO 0 to 5 weight percent, $Al_2O_3$ 0 to 5 weight percent, $K_2O$ 0 to 5 weight percent, $B_2O_3$ 0 to 5% and $MnO_2$ 0 to 0.5%, and a colorant and property modifying material portion comprising total iron up to 0.65 weight percent, Se ranging from 2 PPM to 10 PPM, at least one UV absorber selected from $CeO_2$, $V_2O_5$, $TiO_2$ and $MoO_3$, CoO up to 20 PPM, and $Cr_2O_3$ up to 75 PPM, wherein the glass composition has a redox ratio ranging from 0.2 to 0.6.

In another embodiment, the invention is a glass sheet formed from a glass composition comprising a base glass composition comprising $SiO_2$ 65 to 75 weight percent, $Na_2O$ 10 to 20 weight percent, CaO 5 to 15 weight percent, MgO 0 to 5 weight percent, $Al_2O_3$ 0 to 5 weight percent, $K_2O$ 0 to 5 weight percent, $B_2O_3$ 0 to 5% and $MnO_2$ 0 to 0.5%, and a colorant and property modifying material portion comprising total iron up to 0.65 weight percent, Se ranging from 2 PPM to 10 PPM, at least one UV absorber selected from $CeO_2$, $V_2O_5$, $TiO_2$ and $MoO_3$, CoO up to 20 PPM, and $Cr_2O_3$ up to 75 PPM, wherein the glass composition has a redox ratio ranging from 0.2 to 0.6 and wherein the glass sheet exhibits one or more of the following properties at a thickness of 3.9 mm (0.1535"): (a) a gray color characterized by a dominant wavelength in the range of 480 to 580 nanometers and an excitation purity of equal to or less than 8%; (b) an Lta of equal to or greater than 65%; (c) a total solar infrared transmittance (TSIR) equal to or less than 35%; (d) a total solar energy transmittance (TSET) equal to or less than 55%; and (e) a total solar ultraviolet transmittance (ISOUV) of equal to or less than 30%.

DESCRIPTION OF THE INVENTION

As used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1.0 to 3.8, 6.6 to 9.7 and 5.5 to 10.

As used herein, the term "weight percent" when used to describe the amount of material in a glass composition means the weight percent based on the total weight of the glass composition.

The glass composition of the present invention comprises (a) a base glass portion and (b) a colorant and solar performance property modifying portion. According to the present invention, the base glass portion includes the components shown in Table 1 below in the specified amounts.

TABLE 1

Base Glass Portion

| Component | Concentration in the Glass Composition [Weight Percent based on the Total Weight of the Glass Composition] |
|---|---|
| $SiO_2$ | 65-75% |
| $Na_2O$ | 10-20% |
| CaO | 5-15% |
| MgO | 0-5% |
| $Al_2O_3$ | 0-5% |
| $K_2O$ | 0-5% |
| BaO | 0-1% |
| $B_2O_3$ | 0-5% |
| $MnO_2$ | 0-0.5% |

The described base glass portion is referred in the art as a "soda-lime-silica" glass composition.

According to the present invention, various colorants and materials capable of modifying the solar performance properties of the glass are added to the base glass composition. Both colorants and materials capable of modifying the solar performance properties of the glass are referred to herein as "colorants and property modifying materials". The colorants and property modifying materials of the glass composition of the present invention include: iron oxide ("$Fe_2O_3$" and "FeO"), cerium oxide ("$CeO_2$"), selenium ("Se"), titanium oxide ("$TiO_2$"), erbium oxide ("$Er_2O_3$"), neodymium oxide ("$Nd_2O_3$"), vanadium oxide ("$V_2O_5$"), cobalt oxide ("CoO"), chromium oxide ("$Cr_2O_3$") and nickel oxide ("$Ni_2O_3$").

According to the present invention, iron can be present in the glass composition as both ferric oxide ($Fe_2O_3$) and ferrous oxide (FeO). As is well known in the art, $Fe_2O_3$ is a strong absorber of ultraviolet radiation and is a yellow colorant. As is well known in the art, FeO is a strong absorber of infrared radiation and is a blue colorant.

The "total iron" present in the glass composition of the invention is expressed as "$Fe_2O_3$" as is standard practice in the industry. This does not imply that all of the iron present in the glass composition is in the form of $Fe_2O_3$. The total iron in the glass composition of the present invention ranges up to 0.65 weight percent based on the total weight of the glass composition, for example, from 0.28 to 0.6 weight percent, or from 0.3 to 0.35 weight percent.

The amount of iron present in the ferrous state in the glass composition of the present invention is expressed as "FeO" as is standard practice in the industry. Although the amount of iron in the ferrous state is expressed as FeO, the entire amount in the ferrous state may not actually be present in the glass as FeO.

The glass composition of the present invention has a certain "redox ratio". As used herein, the "redox ratio" is the amount of iron in the ferrous state (expressed as "FeO") divided by the amount of total iron (expressed as "$Fe_2O_3$"). Glass compositions according to the present invention have a redox ratio ranging from 0.2 to 0.6, for example, from 0.25 to 0.55, or from 0.45 to 0.55.

According to the present invention, Se is added to the glass composition of the present invention. Se is known in the art as a pink colorant. The amount of Se in the glass composition ranges from 2 PPM to 10 PPM, for example from 3 PPM to 7 PPM.

According to the present invention, well known UV absorbers such as $CeO_2$, $V_2O_5$, $TiO_2$ and/or molybdenum oxide ("$MoO_3$") are added to the glass composition. Typically, the higher the redox ratio of the glass, the more UV absorbers are required to make up for the loss of UV absorption provided by $Fe_2O_3$. In a non-limiting embodiment of the invention, $CeO_2$ is added to the glass composition in an amount ranging from 0.2 weight percent to 3.0 weight percent, for example, from 0.5 weight percent to 2.5 weight percent. In an another non-limiting embodiment of the invention, $TiO_2$ is added to the glass composition in an amount ranging from 0.1 weight percent to 1.0 weight percent, for example, from 0.2 weight percent to 0.5 weight percent. In yet another non-limiting embodiment of the invention, $MoO_3$ is added to the glass composition in an amount ranging from 0.005 weight percent to 0.075 weight percent, for example, from 0.015 weight percent to 0.045 weight percent.

According to the present invention, vanadium oxide ("$V_2O_5$") can be added to the glass composition. Vanadium is known in the art as an absorber of both UV and IR radiation, depending on its valence state, and as a yellow-green colorant. $V_2O_5$ in the +5 valence state is an UV absorber. $V_2O_4$ in the +4 valence state is an IR absorber. In a non-limiting embodiment of the invention, the amount of $V_2O_5$ in the glass composition is equal to or less than 0.3 weight percent, for example, equal to or less than 0.2 weight percent, or equal to or less than 0.1 weight percent.

According to the present invention, $Er_2O_3$ can be added to the glass composition. $Er_2O_3$ is known in the art as a pink colorant. In a non-limiting embodiment of the invention, the amount of $Er_2O_3$ in the glass composition is equal to or less than 3 weight percent, for example, from 0.1 weight percent to 2 weight percent, or from 0.5 weight percent to 1.7 weight percent.

According to the present invention, $Nd_2O_3$ can be added to the glass composition. $Nd_2O_3$ is known in the art as a blue colorant. In a non-limiting embodiment of the invention, the amount of $Nd_2O_3$ in the glass composition is equal to or less than 3 weight percent, for example, from 0.1 weight percent to 1 weight percent, or from 0.1 weight percent to 0.5 weight percent.

According to the present invention, CoO is added to the glass composition. CoO is known in the art as a blue colorant. In a non-limiting embodiment of the invention, the amount of CoO in the glass composition is equal to or less than 20 PPM, for example, equal to or less than 15 PPM, or equal to or less than 11 PPM.

According to the present invention, $Cr_2O_3$ is added to the glass composition. $Cr_2O_3$ is known in the art as a green colorant and a UV absorber. In a non-limiting embodiment of the invention, the amount of $Cr_2O_3$ in the glass composition is equal to or less than 75 PPM, for example, equal to or less than 50 PPM.

According to the present invention, $Ni_2O_3$ can be added to the glass composition. $Ni_2O_3$ is known in the art as a brown colorant. In a non-limiting embodiment of the invention, the amount of $Ni_2O_3$ in the glass composition is equal to or less than 50 PPM, for example, equal to or less than 25 PPM, or equal to or less than 10 PPM.

The glass composition of the present invention can be produced by conventional glass making processes. For example, the glass composition can be formed from batch materials via crucible melts, a sheet drawing process, a float glass process, etc. Typically, well known batch materials are mixed with colorants and property modifying materials and processed into the glass compositions of the present invention. In a non-limiting embodiment, the glass composition of the present invention is formed via a float glass process as is well known in the art.

As a result of the raw materials/equipment used to form the glass compositions, certain impurities, such as SrO and $ZrO_2$, are likely to be present in the final glass composition. Such materials are present in the glass composition in minor amounts and are referred to herein as "tramp materials". The tramp materials have minimal, if any impact on the properties of the glass.

In a non-limiting embodiment of the invention, the glass composition is formed into a glass substrate. Glass substrates having various thicknesses can be formed. For example, glass substrates having a thickness of up to 24 mm can be formed.

In a non-limiting embodiment, the present invention encompasses a glass substrate having a thickness of 3.9 mm (0.1535 inches) that exhibits the following performance properties:

1. a gray color characterized by a dominant wavelength in the range of 480 to 580 nm, for example, 490-570 nm, or 500-560 nm, and an excitation purity of equal to or less than 8%, for example, equal to or less than 6%, or equal to or less than 4%;
2. an Lta of equal to or greater than 60%, for example, equal to or greater than 65%, or equal to or greater than 70%;
3. a total solar infrared transmittance (TSIR) equal to or less than 40%, for example, equal to or less than 35%, or equal to or less than 30%;
4. a total solar energy transmittance (TSET) equal to or less than 60%, for example, equal to or less than 55%, or equal to or less than 50%; and
5. a total solar ultraviolet transmittance (ISOUV) of equal to or less than 30%, for example, equal to or less than 25%, or equal to or less than 20%.

The abovementioned performance properties are measured as described below:

1. Visible light transmittance (Lta) was measured using C.I.E. 1931 standard illuminant "A" over the wavelength range 380 to 770 nanometers at 10 nanometer intervals.
2. Total solar ultraviolet transmittance (ISOUV) was measured over the wavelength range 280 to 380 nanometers at 5 nanometer intervals according to ISO 9050.
3. Total solar infrared transmittance (TSIR) was measured over the wavelength range 800 to 2100 nanometers at 50 nanometer intervals.
4. Total solar energy transmittance (TSET) represents a computed value based on measured transmittances from 300 to 2100 nanometers at 50 nanometer intervals.
5. Color was measured in terms of dominant wavelength and excitation purity using a C.I.E. 1931 standard illuminant "C" with a 2° observer.

All solar transmittance data was calculated using Parry Moon air mass 2.0 solar data. The transmittance values were integrated over the wavelength range using the Rectangular Rule as is well known in the art.

The spectral properties provided herein are reported at normal angles of incidence. If the angle of incidence relative to the surface normal was increased, the magnitude would change of both the reflected light and absorbed light resulting in a change in the magnitude of the transmitted light.

Also, if the angle of incidence relative to the surface normal was increased, more light, proportionally, is lost due to absorption by the article. This is because the effective path of light traveling through a transparent article of a finite thickness increases proportionally to the inverse of the cosine of the angle of incidence.

In summary, the transmitted magnitude of unpolarized light through a transparent article such as glass is generally less at non-normal angles of incidence than at normal incidence. The previous is true at any given wavelength and is valid for integrated spectral properties such as ISOUV, Lta, TSET, etc. As an example, an automotive windshield at installation angle transmits less ultraviolet, visible or infrared energy or light than the same article measured at normal incidence.

In a non-limiting embodiment of the invention, the glass substrate is used as a glass vision panel. In another non-limiting embodiment of the invention, at least one glass substrate is used to form a laminated article such as an automotive windshield.

EXAMPLES

The present invention is illustrated by the following non-limiting examples. Examples 1-10 were prepared in the following manner. The ingredients shown in Table 2 were weighed out and mixed. Half of the batch materials were placed in a 4 inch silica crucible and heated to 2,450° F. (1,343° C.). The temperature of the crucible was then held at 2,450° F. (1,343° C.) for 30 minutes. The molten batch material was then heated to 2,500° F. (1,371° C.) and held at that temperature for 30 minutes. The molten batch material was then heated to a temperature of 2,550° F. (1,399° C.) and after the other half of the batch materials were added to the crucible, it was held at that temperature for 30 minutes. The molten batch material was then heated to a temperature of 2,600° F. (1,427° C.) and held at that temperature for 1 hour. Next, the molten glass was fritted in water, dried and reheated to 2,650° F. (1,454° C.) in a platinum crucible for two hours. The molten glass was then poured out of the crucible to form a slab and annealed. Samples were cut from the slab and ground and polished for analysis.

TABLE 2

| | Raw Materials for the Batch | | | | | | | | | |
|---|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 | Ex. 10 |
| Sand [g] | 332.91 | 332.91 | 330.58 | 332.91 | 329.14 | 329.24 | 329.23 | 332.62 | 333.75 | 333.75 |
| Soda Ash [g] | 108.86 | 108.86 | 108.10 | 108.86 | 107.63 | 107.66 | 107.66 | 108.77 | 109.13 | 109.13 |
| Dolomite [g] | 80.23 | 80.23 | 79.67 | 80.23 | 79.32 | 79.35 | 79.34 | 80.16 | 80.43 | 80.43 |
| Limestone [g] | 28.30 | 28.30 | 28.10 | 28.30 | 27.98 | 27.99 | 27.98 | 28.27 | 28.37 | 28.37 |
| Salt Cake [g] | 2.3304 | 2.3304 | 2.3141 | 2.3304 | 2.3039 | 2.3047 | 2.3046 | 2.3283 | 2.3362 | 2.3362 |
| Coal [g] | 0.5493 | 0.5493 | 1.7851 | 0.5992 | 2.0406 | 1.5145 | 1.5638 | 1.1642 | 0.9345 | 1.0012 |
| Rouge [g] | 3.2062 | 3.2062 | 0.8680 | 3.2062 | 0.7899 | 0.7902 | 0.7902 | 0.8119 | 0.9311 | 0.9311 |
| Cobalt [g] | 0.0074 | 0.0074 | 0.0090 | 0.0074 | 0.0082 | 0.0082 | 0.0082 | 0.0043 | 0.0043 | 0.0043 |
| Metallic Se [g] | 0.0125 | 0.0143 | 0.0470 | 0.0147 | 0.0778 | 0.0778 | 0.0778 | 0.0379 | 0.0621 | 0.0632 |
| $TiO_2$ [g] | | | 2.0051 | | | | | | | |

TABLE 2-continued

Raw Materials for the Batch

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Sodium Nitrate [g] | 2.9962 | 2.9962 | 2.9752 | 2.9962 | 2.9622 | 2.9632 | 2.9631 | 2.9936 | 3.0037 | 3.0037 |
| Cerium Carbonate [g] | 2.8697 | 2.8697 | 14.7473 | 2.8697 | 27.5420 | 27.5509 | 27.5501 | 11.4787 | 5.7404 | 5.7404 |
| Green Cullet [g] | 240.93 | 240.93 | 244.69 | 240.93 | 248.41 | 248.26 | 248.27 | 243.64 | 241.96 | 241.96 |

The glass composition for each Example was determined using a RIGAKU 3370 X-ray fluorescence spectrometer. The results of the analysis are shown in Table 3.

TABLE 3

Glass Compositions according to the Present Invention

| Component | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Redox ratio | 0.246 | 0.268 | 0.313 | 0.317 | 0.353 | 0.357 | 0.362 | 0.423 | 0.441 | 0.489 |
| total iron [wt. %] | 0.607 | 0.624 | 0.311 | 0.627 | 0.318 | 0.292 | 0.296 | 0.300 | 0.311 | 0.316 |
| CoO [PPM] | 8 | 8 | 9 | 9 | 7 | 9 | 9 | 5 | 3 | 4 |
| Se [PPM] | 4 | 3 | 4 | 3 | 7 | 3 | 7 | 3 | 4 | 4 |
| $Cr_2O_3$ [PPM] | <10 | 5 | <10 | 5 | <10 | <10 | <10 | 6 | <10 | <10 |
| $CeO_2$ [wt. %] | 0.26 | 0.26 | 2.03 | 0.26 | 2.35 | 2.20 | 2.42 | 1.05 | 0.53 | 0.53 |
| $TiO_2$ [wt. %] | 0.024 | 0.023 | 0.261 | 0.025 | 0.023 | 0.270 | 0.021 | 0.022 | 0.023 | 0.024 |
| $Fe(S)_x$ [PPM] | | | | | 1 | 0.3 | 0.5 | 0.4 | 1.2 | 1.4 |
| $SO_3$ [wt. %] | 0.193 | 0.171 | 0.089 | 0.15 | 0.18 | 0.075 | 0.088 | 0.082 | 0.088 | 0.076 |

The spectral performance properties of the examples were determined using a Perkin-Elmer Lambda 9 UV/VIS/NIR spectrophotometer. The performance properties for a 3.9 mm thick sample are shown in Table 4.

TABLE 4

Performance Properties for a 3.9 mm Thick Glass Substrates according to the Present Invention

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Lta [%] | 70.08 | 70.04 | 72.38 | 68.65 | 68.99 | 73.83 | 69.18 | 74.65 | 72.02 | 71.59 |
| ISOUV [%] | 19.26 | 19.48 | 10.57 | 20.43 | 11.80 | 10.82 | 12.12 | 19.90 | 22.91 | 23.80 |
| TSIR [%] | 36.31 | 32.63 | 49.94 | 27.04 | 47.39 | 47.49 | 46.98 | 40.06 | 37.70 | 34.30 |
| TSET [%] | 51.47 | 49.49 | 59.32 | 46.02 | 56.54 | 58.97 | 56.62 | 55.82 | 53.24 | 51.33 |
| DW [nm] | 555.69 | 534.11 | 572.09 | 500.42 | 576.16 | 562.09 | 575.41 | 515.97 | 559.74 | 536.68 |
| Pe [%] | 2.62 | 1.62 | 5.42 | 2.14 | 6.41 | 2.85 | 5.46 | 0.79 | 2.10 | 1.15 |

Based on Table 4, the glass composition of the present invention can be used to form glass substrates that exhibit the various performance properties. The non-limiting examples show a glass composition having a gray color can be formed having an Lta ranging from 60% to 80%, for example, from 65% to 77%; a ISOUV ranging from 5% to 27%, for example, from 10% to 25%; a TSIR ranging from 25% to 55%, for example, from 30% to 50%; a TSET ranging from 40% to 65%, for example, from 45% to 60%; a DW ranging from 510 nm to 582 nm, for example, from 515 nm to 577 nm; and a Pe up to 6.5%.

It will be readily appreciated by those skilled in the art that modifications may be made to the invention without departing from the concepts disclosed in the foregoing description. Such modifications are to be considered as included within the scope of the invention. Accordingly, the particular embodiments described in detail hereinabove are illustrative only and are not limiting as to the scope of the invention, which is to be given the full breadth of the appended claims and any and all equivalents thereof.

We claim:

1. A glass composition comprising a base glass composition, comprising:

| | |
|---|---|
| $SiO_2$ | 65 to 75 weight percent, |
| $Na_2O$ | 10 to 20 weight percent, |
| CaO | 5 to 15 weight percent, |
| MgO | 0 to 5 weight percent, |
| $Al_2O_3$ | 0 to 5 weight percent, |
| $K_2O$ | 0 to 5 weight percent, |
| $B_2O_3$ | 0 to 5 weight percent, and |
| $MnO_2$ | 0 to 0.5 weight percent | and a colorant and property modifying material portion consisting essentially of:
   total iron up to 0.65 weight percent,
   Se ranging from 2 PPM to 10 PPM,
   at least one UV absorber selected from $CeO_2$, $V_2O_5$, $TiO_2$ and $MoO_3$,
   CoO up to 20 PPM, and
   $Cr_2O_3$ up to 75 PPM,
   wherein the glass composition has a redox ratio ranging from 0.45-0.55.

2. The glass composition according to claim 1, wherein the UV absorber is $CeO_2$ present in an amount ranging from 0.2 weight percent to 3.0 weight percent.

3. The glass composition according to claim 1, wherein the UV absorber is $TiO_2$ present in an amount ranging from 0.1 weight percent to 1.0 weight percent.

4. The glass composition according to claim 1, wherein the total iron ranges from 0.28 to 0.6 weight percent.

5. The glass composition according to claim 1, wherein the Se ranges from 3 PPM to 7 PPM.

6. The glass composition according to claim 1, further comprising $Nd_2O_3$ ranging from 0.1 weight percent to 1 weight percent.

7. The glass composition according to claim 1, wherein the UV absorber is $V_2O_5$ present in an amount equal to or less than 02 weight percent.

8. The glass composition according to claim 1, wherein the UV absorber is $MoO_3$ present in an amount ranging from 0.005 to 0.075 weight percent.

9. The glass composition according to claim 1, wherein the CoO is equal to or less than 15 PPM.

10. The glass composition according to claim 1, wherein the $Cr_2O_3$ is equal to or less than 50 PPM.

11. The glass composition according to claim 1, further comprising $Ni_2O_3$ in an amount equal to or less than 25 PPM.

12. A glass sheet made from the composition as recited in claim 1.

13. A laminated article incorporating a glass sheet according to claim 12.

14. A glass composition comprising a base glass composition, comprising:

| | |
|---|---|
| $SiO_2$ | 65 to 75 weight percent, |
| $Na_2O$ | 10 to 20 weight percent, |
| CaO | 5 to 15 weight percent, |
| MgO | 0 to 5 weight percent, |
| $Al_2O_3$ | 0 to 5 weight percent, |
| $K_2O$ | 0 to 5 weight percent, |
| $B_2O_3$ | 0 to 5% weight percent, and |
| $MnO_2$ | 0 to 0.5% weight percent | and a colorant and property modifying material portion comprising;
   total iron up to 0.65 weight percent,
   Se ranging from 2 PPM to 10 PPM,
   at least one UV absorber selected from $CeO_2$, $V_2O_5$, $Ti_2$ and $MoO_3$,
   CoO up to 20 PPM, and
   $Cr_2O_3$ up to 75 PPM,
   wherein the glass composition has a redox ratio ranging from 0.2 to 0.6, and further comprising at least one additional colorant and property modifying material portion selected from the group comprising $Er_2O_3$ in the range of from 0.1 weight percent to 2 weight percent, $Nd_2O_3$ in the range of from 0.1 weight percent to 1 weight percent, and $MoO_3$ the range of from 0.005 to 0.075 weight percent.

15. A glass composition comprising a base glass composition, comprising:

| | |
|---|---|
| $SiO_2$ | 65 to 75 weight percent, |
| $Na_2O$ | 10 to 20 weight percent, |
| CaO | 5 to 15 weight percent, |
| MgO | 0 to 5 weight percent, |
| $Al_2O_3$ | 0 to 5 weight percent, |
| $K_2O$ | 0 to 5 weight percent, |
| $B_2O_3$ | 0 to 5% weight percent, and |
| $MnO_2$ | 0 to 0.5% weight percent | and a colorant and property modifying material portion consisting essentially of:
   total iron up to 0.65 weight percent,
   Se ranging from 2 PPM to 10 PPM,
   at least one UV absorber selected from $CeO_2$, $VO_5$, $TiO_2$ and $MoO_3$
   CoO up to 20 PPM, and
   $Cr_2Q_3$ up to 75 PPM,
   wherein the glass composition has a redox ratio ranging from 0.2 to 0.6 and the glass sheet exhibits the following properties at a thickness of 3.9 mm (0.1535"): (a) a gray color characterized by a dominant wavelength in the range of 480 to 580 nanometers and an excitation purity of equal to or less than 8%; (b) an Lta of equal to or greater than 60%; (c) a total solar infrared transmittance (TSIR) equal to or less than 40%; (d) a total solar energy transmittance (TSET) equal to or less than 60%; and (e) a total solar ultraviolet transmittance (ISOUV) of equal to or less than 30%.

16. The glass sheet according to claim 15 that exhibits one or more of the following properties at a thickness of 3.9mm (0.1535"): (a) an Lta of equal to or greater than 65%; (b) an total solar infrared transmittance (TSIR) equal to or less than 35%; (c) a total solar energy transmittance (TSET) equal to or less than 55%; and (d) a total solar ultraviolet transmittance (ISOUV) of equal to or less than 25%.

17. A glass sheet formed from a glass composition comprising a base glass composition comprising:

| | |
|---|---|
| $SiO_2$ | 65 to 75 weight percent, |
| $Na_2O$ | 10 to 20 weight percent, |
| CaO | 5 to 15 weight percent, |
| MgO | 0 to 5 weight percent, |
| $Al_2O_3$ | 0 to 5 weight percent, |
| $K_2O$ | 0 to 5 weight percent, |
| $B_2O_3$ | 0 to 5 weight percent, and |
| $MnO_2$ | 0 to 0.5 weight percent | and a colorant and property modifying material portion consisting essentially of:
   total iron up to 0.65 weight percent,
   Se ranging from 2 PPM to 10 PPM,
   at least one UV absorber selected from $CeO_2$, $V_2O_5$, $TiO_2$ and $MoO_3$,
   CoO up to 20 PPM, and
   $Cr_2O_3$ up to 75 PPM,
   wherein the glass composition has a redox ratio ranging from 0.45 to 0.55 and
   wherein the glass sheet exhibits the following properties at a thickness of 3.9 mm (0.1535"): (a) a gray color characterized by a dominant wavelength in the range of 480 to 580 nanometers and an excitation purity of equal to or less than 8%; (b) an Lta of equal to or greater than 65%; (c) a total solar infrared transmittance (TSIR) equal to or less than 35%; (d) a total solar energy transmittance (TSET) equal to or less than 55%; and (e) a total solar ultraviolet transmittance (ISOUV) of equal to or less than 25%.

18. The glass sheet according to claim 17 wherein the dominant wavelength is in the range of 500-560 nanometers.

19. The glass sheet according to claim 18 wherein the total solar ultraviolet transmittance (ISOUV) is equal to or less than 25%.

20. The glass sheet according to claim 17 wherein the dominant wavelength is in the range of 515-577 nanometers.

* * * * *